(12) United States Patent
Ogasawara et al.

(10) Patent No.: US 9,244,317 B2
(45) Date of Patent: Jan. 26, 2016

(54) ACTIVE MATRIX SUBSTRATE AND DISPLAY DEVICE

(75) Inventors: Isao Ogasawara, Osaka (JP); Masahiro Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 142 days.

(21) Appl. No.: 13/639,154

(22) PCT Filed: Jan. 25, 2011

(86) PCT No.: PCT/JP2011/051333
§ 371 (c)(1),
(2), (4) Date: Oct. 3, 2012

(87) PCT Pub. No.: WO2011/132440
PCT Pub. Date: Oct. 27, 2011

(65) Prior Publication Data
US 2013/0027280 A1     Jan. 31, 2013

(30) Foreign Application Priority Data

Apr. 22, 2010   (JP) .................................. 2010-098920

(51) Int. Cl.
*G09G 3/20* (2006.01)
*G02F 1/1345* (2006.01)

(52) U.S. Cl.
CPC .. *G02F 1/13454* (2013.01); *G02F 2001/13456* (2013.01)

(58) Field of Classification Search
CPC ........... G02F 1/1345; G09G 3/20; G09G 3/36
USPC .......................... 345/55, 88; 349/149; 257/91
See application file for complete search history.

(56) References Cited

U.S. PATENT DOCUMENTS

| 6,414,730 | B1 | 7/2002 | Akamatsu et al. |
| 2003/0222311 | A1 | 12/2003 | Kim |
| 2004/0238825 | A1* | 12/2004 | Lim et al. ........................ 257/79 |
| 2004/0245641 | A1 | 12/2004 | Eguchi |
| 2005/0030465 | A1* | 2/2005 | Park et al. ..................... 349/149 |
| 2005/0104070 | A1 | 5/2005 | Kim et al. |
| 2005/0275609 | A1 | 12/2005 | Lee et al. |

(Continued)

FOREIGN PATENT DOCUMENTS

| JP | 11-190857 A | 7/1999 |
| JP | 2000-199917 A | 7/2000 |

(Continued)

OTHER PUBLICATIONS

Official Communication issued in International Patent Application No. PCT/JP2011/051333, mailed on Apr. 26, 2011.

*Primary Examiner* — Waseem Moorad
*Assistant Examiner* — Mark Edwards
(74) *Attorney, Agent, or Firm* — Keating & Bennett, LLP

(57) ABSTRACT

A scan signal line drive circuit (32) for driving switching elements is provided in a frame area (24) of an active matrix substrate (20). A driver TFT element (42) is provided in each circuit section (36) which is part of a scan signal line drive circuit (32). The frame area (24) has a branch line (43) as a second line for supplying a signal to the driver TFT element (42) and a connecting line (44) as a first line connected to the branch line (43). The connecting line (44) and the branch line (43) are connected to each other in a connecting section (60). Both of the sides of the branch line (43), which specify the width of the branch line (43), are disposed in a contact hole (61) in planar view, the contact hole (61) being provided in a second insulating layer.

18 Claims, 12 Drawing Sheets

(56) References Cited

U.S. PATENT DOCUMENTS

| | | |
|---|---|---|
| 2006/0022201 A1 | 2/2006 | Kim et al. |
| 2008/0266210 A1* | 10/2008 | Nonaka .................. 345/55 |
| 2009/0289882 A1* | 11/2009 | Masui ..................... 345/88 |
| 2010/0283931 A1 | 11/2010 | Horiuchi et al. |

FOREIGN PATENT DOCUMENTS

| | | |
|---|---|---|
| JP | 2002-215105 A | 7/2002 |
| JP | 2004-296665 A | 10/2004 |
| JP | 2004-309849 A | 11/2004 |
| JP | 2005-018081 A | 1/2005 |
| JP | 2005-128538 A | 5/2005 |
| JP | 2005-352455 A | 12/2005 |
| JP | 2006-039524 A | 2/2006 |
| JP | 2008-292995 A | 12/2008 |
| JP | 2009-282362 A | 12/2009 |
| WO | 2009/128179 A1 | 10/2009 |

* cited by examiner (a)

(b)

US 9,244,317 B2

ACTIVE MATRIX SUBSTRATE AND DISPLAY DEVICE

TECHNICAL FIELD

The present invention relates to an active matrix substrate including an insulating substrate provided with active elements and also to a display device using the active matrix substrate.

BACKGROUND ART

An active matrix display device, in which thin film transistors (hereinafter, "TFTs") or like devices are used as switching elements for pixels, is quick to respond and easy to achieve a grayscale display. Due to these advantages, the active matrix display device has been used recently in a broad range of applications, such as mobile phones, mobile game machines, onboard navigation devices, as well as in television sets.

The active matrix display device generally includes an active matrix substrate and a counter substrate which are disposed so as to face each other, with a display element (liquid crystal, organic EL, etc.) being disposed between the substrates and sealed with a sealant.

Meanwhile, display devices, in which a scan signal line drive circuit, a data signal line drive circuit, etc. are formed monolithically on an active matrix substrate, allow for compact frame areas and improved reliability, and therefore preferentially being used in mobile information terminals, such as mobile phones and mobile type game machines.

(Active Matrix Substrate)

Referring to FIG. 9, the following will describe a schematic arrangement of an active matrix substrate in which a scan signal line drive circuit is formed monolithically. FIG. 9 is a plan view illustrating a schematic arrangement of a major part of the active matrix substrate.

As illustrated in FIG. 9, the active matrix substrate 20 has a display area 22 which is formed at a central part of an insulating substrate 21 made from, for example, a glass substrate. In the display area 22 are there formed pixel electrodes (not shown), display driver TFT elements (switching elements; not shown), etc. in a matrix manner. Each display driver TFT element has a gate electrode connected to a scan signal line 30, a source electrode connected to a data signal line 31, and a drain electrode connected to a pixel electrode (not shown). The scan signal lines 30 and the data signal lines 31 are disposed so as to intersect at right angles with each other in the display area 22 of the active matrix substrate 20. Note that the scan signal lines 30 and the data signal lines 31 are disposed in different layers on the active matrix substrate 20 with an intervening insulating layer therebetween, so that they are not electrically connected to each other at the intersections.

A frame area 24 is formed in an area surrounding the display area 22 near a substrate perimeter 26 of the active matrix substrate 20. Scan signal line drive circuits 32 are provided in the right and left (with respect to a direction indicated by arrow X in FIG. 9) portions of the frame area 24 so as to sandwich the display area 22. The scan signal line drive circuits 32 are electrically connected to the scan signal lines 30 to apply scan signals to the scan signal lines 30.

Since the scan signal line drive circuits 32 are provided in both the right and left portions of the frame area 24 so as to sandwich the display area 22, when a signal is fed to a scan signal line 30 from both the right and left sides, signal waveform distortion is reduced. Thus, the driver TFT elements which constitute the scan signal line drive circuits 32 can be reduced in size, and it is possible to provide an active matrix substrate 20 with a narrower frame area 24. In contrast, even when a signal is fed to a scan signal line 30 from either the right or left side, the frame area 24 can be sized equally on the right and left sides of the active matrix substrate 20 by dividing the scan signal lines 30 into a group which is driven by the right-side scan signal line drive circuit 32 and a group which is driven by the left-side scan signal line drive circuit 32.

A driver 33 is provided in either the top or bottom (with respect to a direction indicated by arrow Y in FIG. 9) portion of the frame area 24. The driver 33 is electrically connected to the data signal lines 31 to apply data signals to the data signal lines 31.

Wiring 35, including clock wires, which is provided for the scan signal line drive circuits is connected to terminals 34 formed by, for example, a patterned thin metal film, so as to supply signals needed to operate the scan signal line drive circuits 32 from an external DC/DC converter, an external display control circuit, etc. via FPCs (flexible printed circuits; not shown), etc.

Note that the active matrix substrate 20 shown in FIG. 9 includes two scan signal line drive circuits 32, one on each of the right and left sides of the display area 22. Alternatively, the active matrix substrate 20 may include only one scan signal line drive circuit 32. In addition, signals which are supplied to the wiring 35 may be supplied from the driver 33.

(Patent Literature 1)

A specific arrangement of a scan signal line drive circuit is described, for example, in Patent Literature 1.

FIG. 10 is a layout diagram representing an arrangement of a major part of a scan signal line drive circuit described in Patent Literature 1.

As illustrated in FIG. 10, in a frame area of an active matrix substrate 100, there are provided a scan signal line drive circuit 400, wires 122 for a scan signal line drive circuit, and connecting lines 172. The wires 122 include clock wires.

The scan signal line drive circuit 400 includes driver TFT elements T5, T6, T10, T11, and T41 to T45, etc. The wires 122 apply signals needed by the driver TFT elements either directly or via the connecting lines 172.

Note that a wire 122 and a corresponding connecting line 172 are electrically connected to each other via two contact holes 200.

CITATION LIST

Patent Literature

Patent Literature 1
Japanese Patent Application Publication, Tokukai, No. 2006-39524A (Published Feb. 9, 2006)
Patent Literature 2
Japanese Patent Application Publication, Tokukai, No. 2005-352455A (Published Dec. 22, 2005)
Patent Literature 3
Japanese Patent Application Publication, Tokukaihei, No. 11-190857A (Published Jul. 13, 1999)
Patent Literature 4
Japanese Patent Application Publication, Tokukai, No. 2000-199917A (Published Jul. 18, 2000)

SUMMARY OF INVENTION

Technical Problem

However, the arrangement described in Patent Literature 1 has problems. A connecting line 172 is shaped so as to protrude with respect to a corresponding wire 122, and the wire 122 and the connecting line 172 are electrically connected to each other via two contact holes 200. Therefore, the connecting section occupies large area, adding to the frame area.

In view of the problems, it is an object of the present invention to provide an active matrix substrate, as well as display device, which has a narrow frame area and is highly reliable.

Solution to Problem

To solve the problems, an active matrix substrate of the present invention is an active matrix substrate including, on an insulating substrate, switching elements and pixel electrodes in a matrix manner, the pixel electrodes being connected to the switching elements, the pixel electrodes being provided in a matrix manner in a display area of the insulating substrate, a frame area being provided so as to surround the display area, the frame area having a drive circuit for driving the switching elements, the drive circuit including a plurality of circuit sections having respective drive elements, the frame area having, on the insulating substrate, a first line and a second line, provided sequentially, for supplying signals to the drive elements, a first insulating layer being provided between the first line and the second line, a second insulating layer being provided so as to cover the first insulating layer and at least one of the first line and the second line, in a connecting section in which the first line and the second line are connected to each other, the second insulating layer having a first contact hole, and
at least one of sides of at least one of the first line and the second line being disposed in the first contact hole in planar view, the sides specifying a width of the one of the first line and the second line.

According to the arrangement, the connecting section where the first line and the second line are connected to each other occupies less area, and so does the drive circuit. Thus, the arrangement facilitates narrowing of the frame area.

Furthermore, it is possible to widen a space separating the lines (wires) from each other and therefore reduce leak between the lines. Thus, the arrangement allows for yield improvement.

To solve the problems, an active matrix substrate of the present invention is an active matrix substrate including, on an insulating substrate, switching elements and pixel electrodes in a matrix manner, the pixel electrodes being connected to the switching elements, the pixel electrodes being provided in a matrix manner in a display area of the insulating substrate, a frame area being provided so as to surround the display area, the frame area having a drive circuit for driving the switching elements, the drive circuit including a plurality of circuit sections having respective drive elements, the frame area having, on the insulating substrate, a first line and a second line, provided sequentially, for supplying signals to the drive elements, a first insulating layer being provided between the first line and the second line, a second insulating layer being provided so as to cover the first insulating layer and at least one of the first line and the second line, in a connecting section in which the first line and the second line are connected to each other, the second insulating layer having two first contact holes,
each of the two first contact holes being provided in a direction in which either one of the first line and the second line extends,
a part of the other one of the first line and the second line being disposed in each of the two first contact holes in planar view, and
at least one of sides of the part of the other one of the first line and the second line being disposed in the first contact hole in planar view, the sides specifying a width of the part.

According to the arrangement, the first line and the second line are electrically connected at two sites. Therefore, the first line and the second line cab be unfailingly connected, improving reliability.

As mentioned above, the connecting section occupies less area, and so does the scan signal line drive circuit. Thus, the arrangement facilitates narrowing of the frame area.

In addition, the sum of the areas of the two sites of the connecting section is unlikely to vary even if, for example, the second line is out of alignment with respect to the first line or the contact holes.

Advantageous Effects of Invention

An active matrix substrate in accordance with the present invention is an active matrix substrate including, on an insulating substrate, switching elements and pixel electrodes in a matrix manner, the pixel electrodes being connected to the switching elements, the pixel electrodes being provided in a matrix manner in a display area of the insulating substrate, a frame area being provided so as to surround the display area, the frame area having a drive circuit for driving the switching elements, the drive circuit including a plurality of circuit sections having respective drive elements, the frame area having, on the insulating substrate, a first line and a second line, provided sequentially, for supplying signals to the drive elements, a first insulating layer being provided between the first line and the second line, a second insulating layer being provided so as to cover the first insulating layer and at least one of the first line and the second line, in a connecting section in which the first line and the second line are connected to each other, the second insulating layer having a first contact hole, and
at least one of sides of at least one of the first line and the second line being disposed in the first contact hole in planar view, the sides specifying a width of the one of the first line and the second line.

Therefore, the connecting section where one of the first lines and a corresponding one of the second lines are connected to each other occupies less area, and so does the drive circuit. Thus, narrowing of the frame area is facilitated.

Furthermore, it is possible to widen a space separating the lines (wires) from each other and therefore reduce leak between the lines. Thus, it is possible to improve yield.

BRIEF DESCRIPTION OF DRAWINGS (a) of FIG. 1 is a layout drawing representing an arrangement of a major part of a scan signal line drive circuit in accordance with embodiment 1, and (b) of FIG. 1 is an enlarged view representing an arrangement of a switching section shown in (a) of FIG. 1.

FIG. 2 is a side view illustrating an arrangement of a major part of a display device in accordance with embodiment 1.

(a) of FIG. 3 is a plan view illustrating an arrangement of a switching section in accordance with embodiment 1, and (b) of FIG. 3 is a cross-sectional view of the switching section shown in (a) of FIG. 3, taken along line X-X'.

Figure 7:
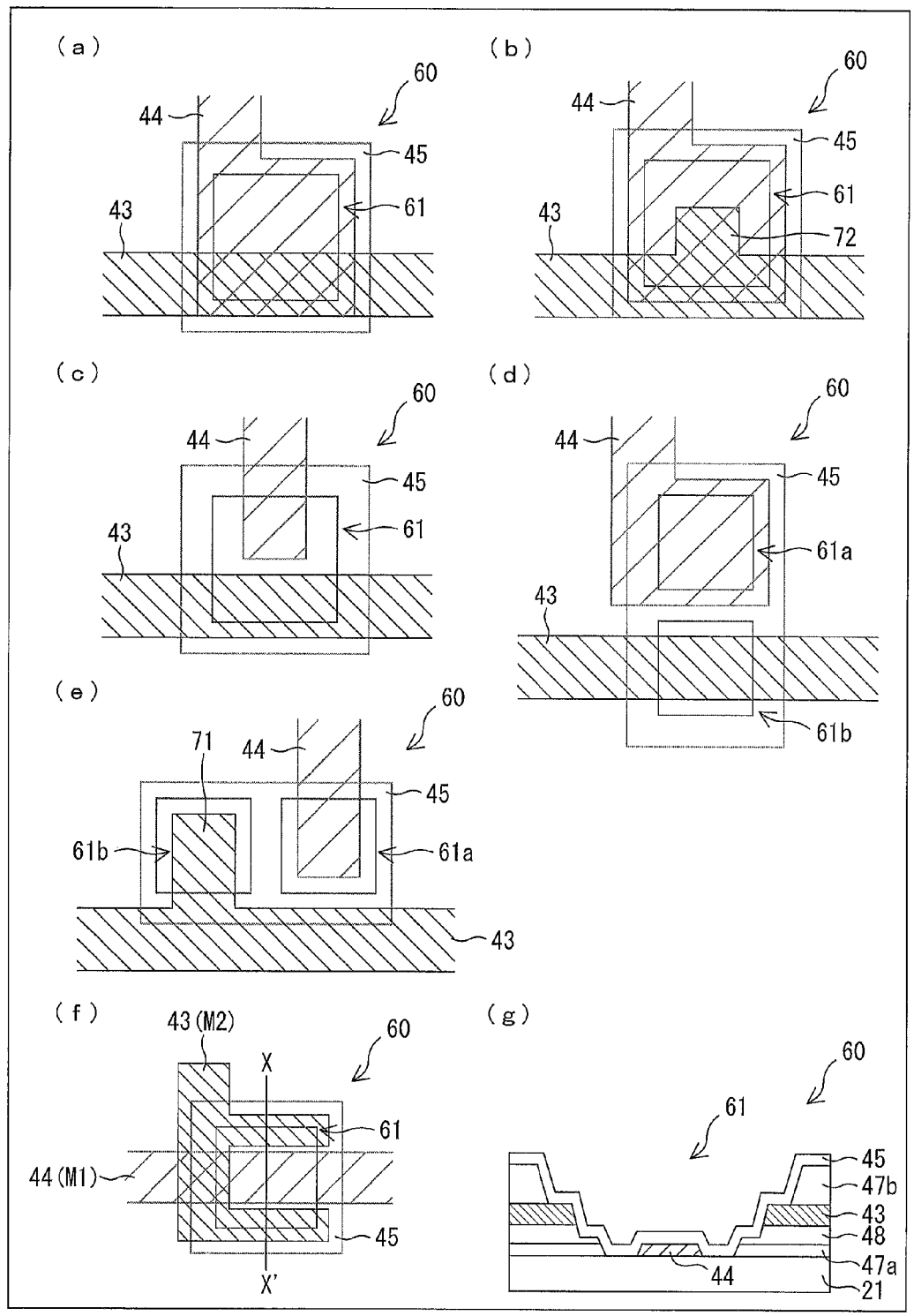

(a) of FIG. 7 to (g) of FIG. 7 are plan views illustrating variation examples of the arrangement of the switching section in accordance with embodiment 1.

Figure 8:
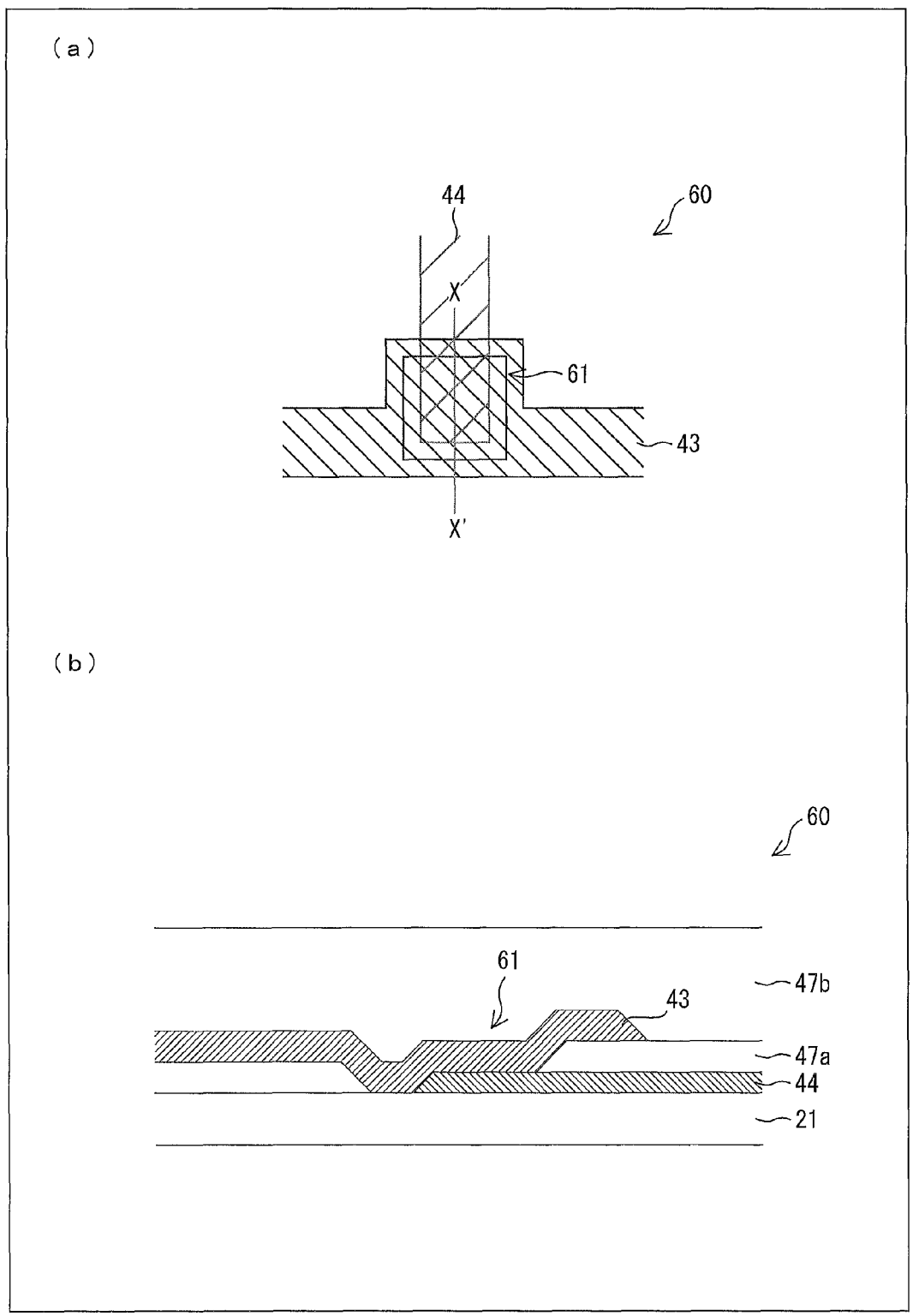

(a) of FIG. 8 is a plan view illustrating an arrangement of a switching section in accordance with embodiment 2, and (b) of FIG. 8 is a cross-sectional view of the switching section shown in (a) of FIG. 8, taken along line X-X'.

Figure 9:
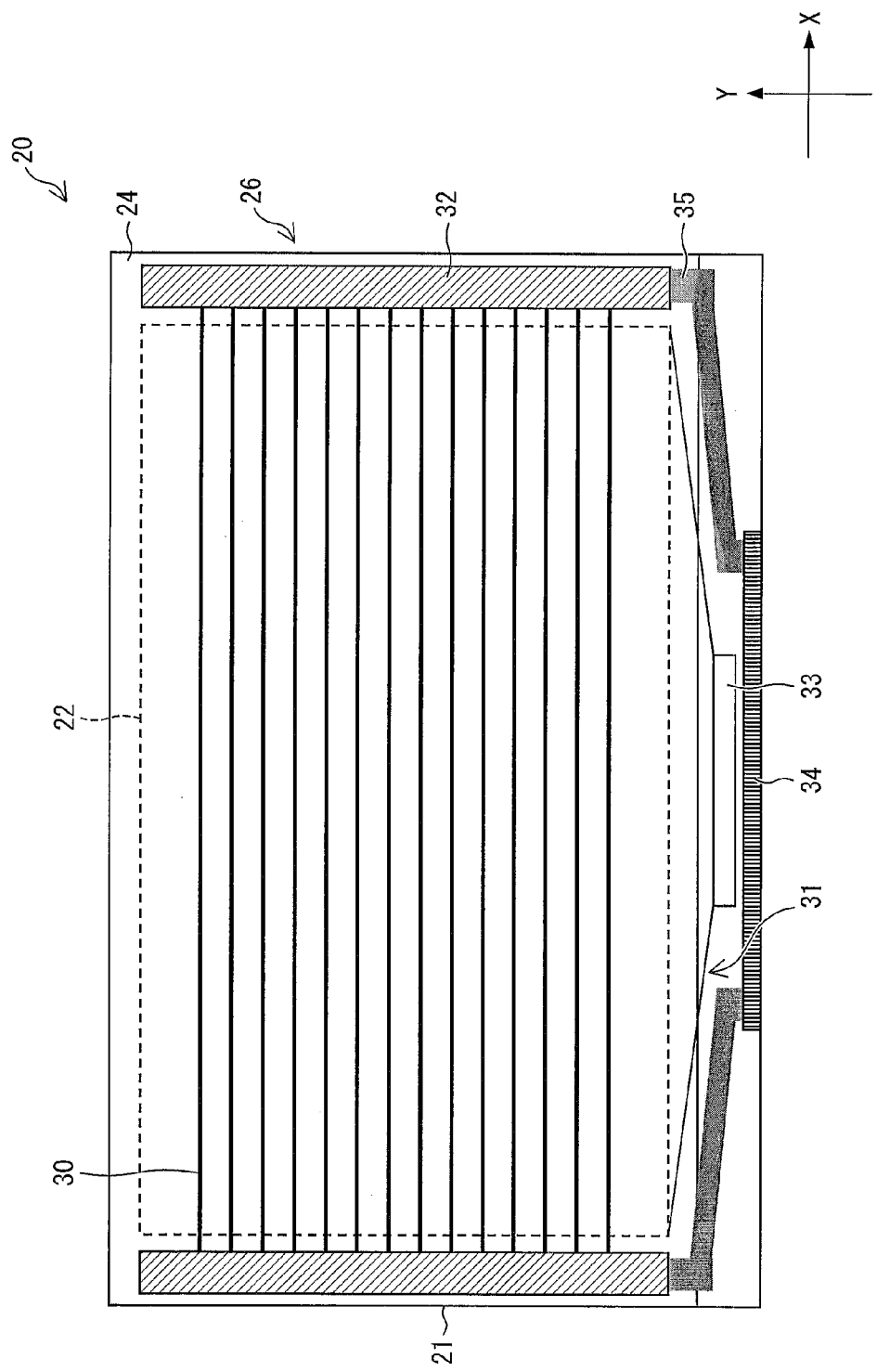

FIG. 9 is a plan view illustrating a schematic arrangement of a major part of a conventional active matrix substrate.

Figure 10:
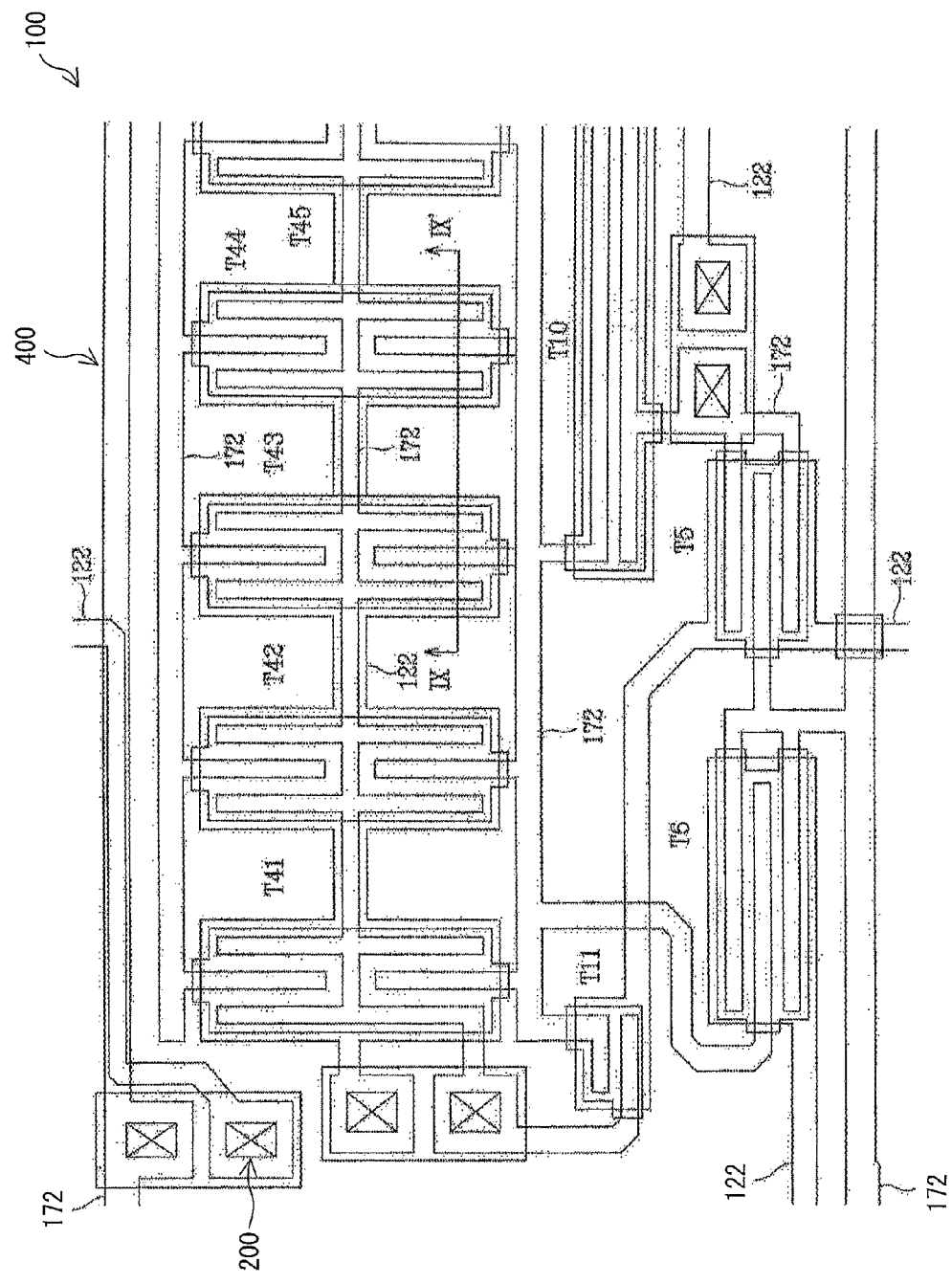

FIG. 10 is a layout diagram representing an arrangement of a major part of a scan signal line drive circuit described in Patent Literature 1.

Figure 11:
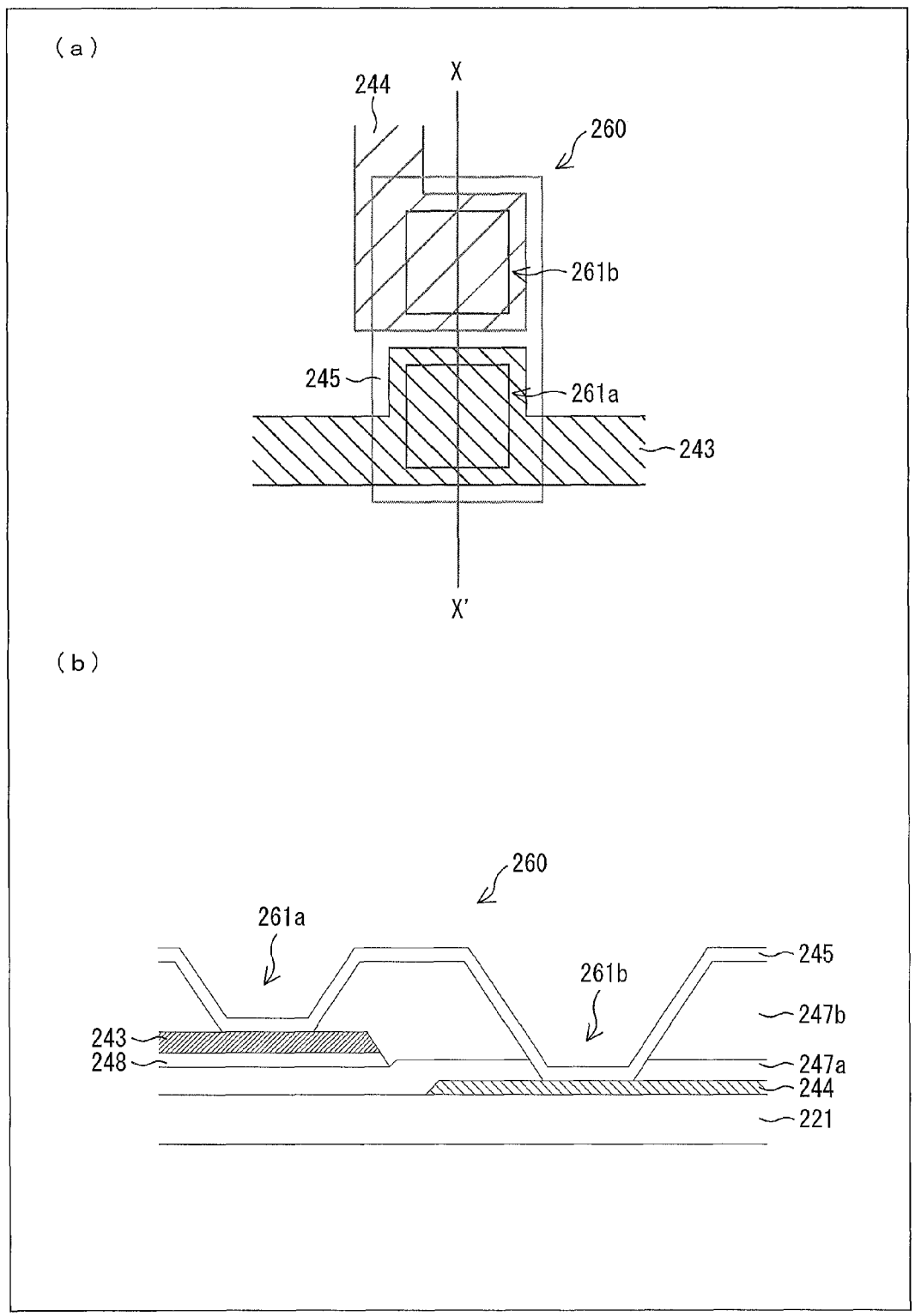

(a) of FIG. 11 is a plan view illustrating an arrangement of a conventional switching section, and (b) of FIG. 11 is a cross-sectional view of the switching section shown in (a) of FIG. 11, taken along line X-X'.

Figure 12:
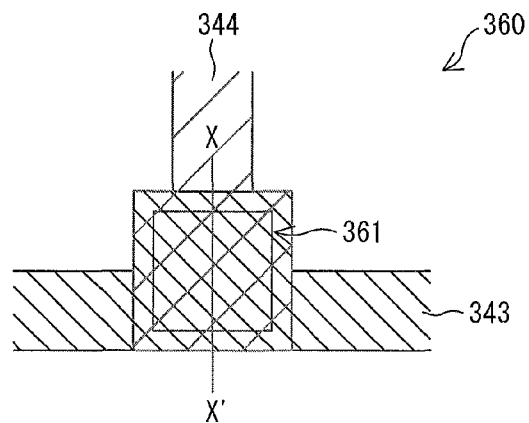
Figure 12:
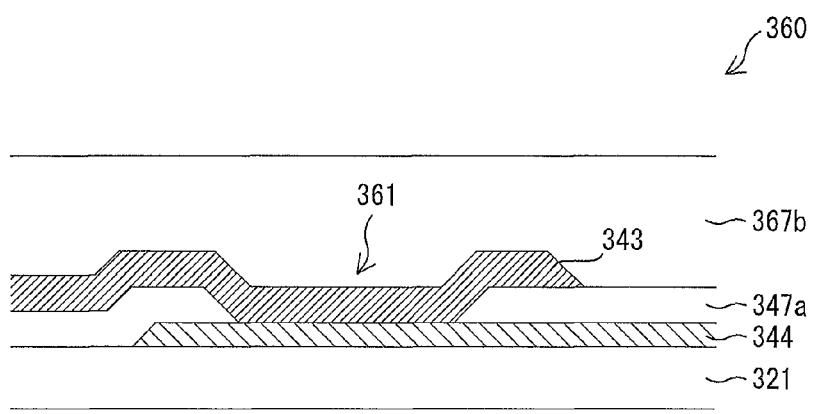

(a) of FIG. 12 is a plan view illustrating an arrangement of a conventional switching section, and (b) of FIG. 12 is a cross-sectional view of the switching section shown in (a) of FIG. 12, taken along line X-X'.

DESCRIPTION OF EMBODIMENTS

The following will describe in detail an embodiment in accordance with the present invention.

Embodiment 1

Figure 1:
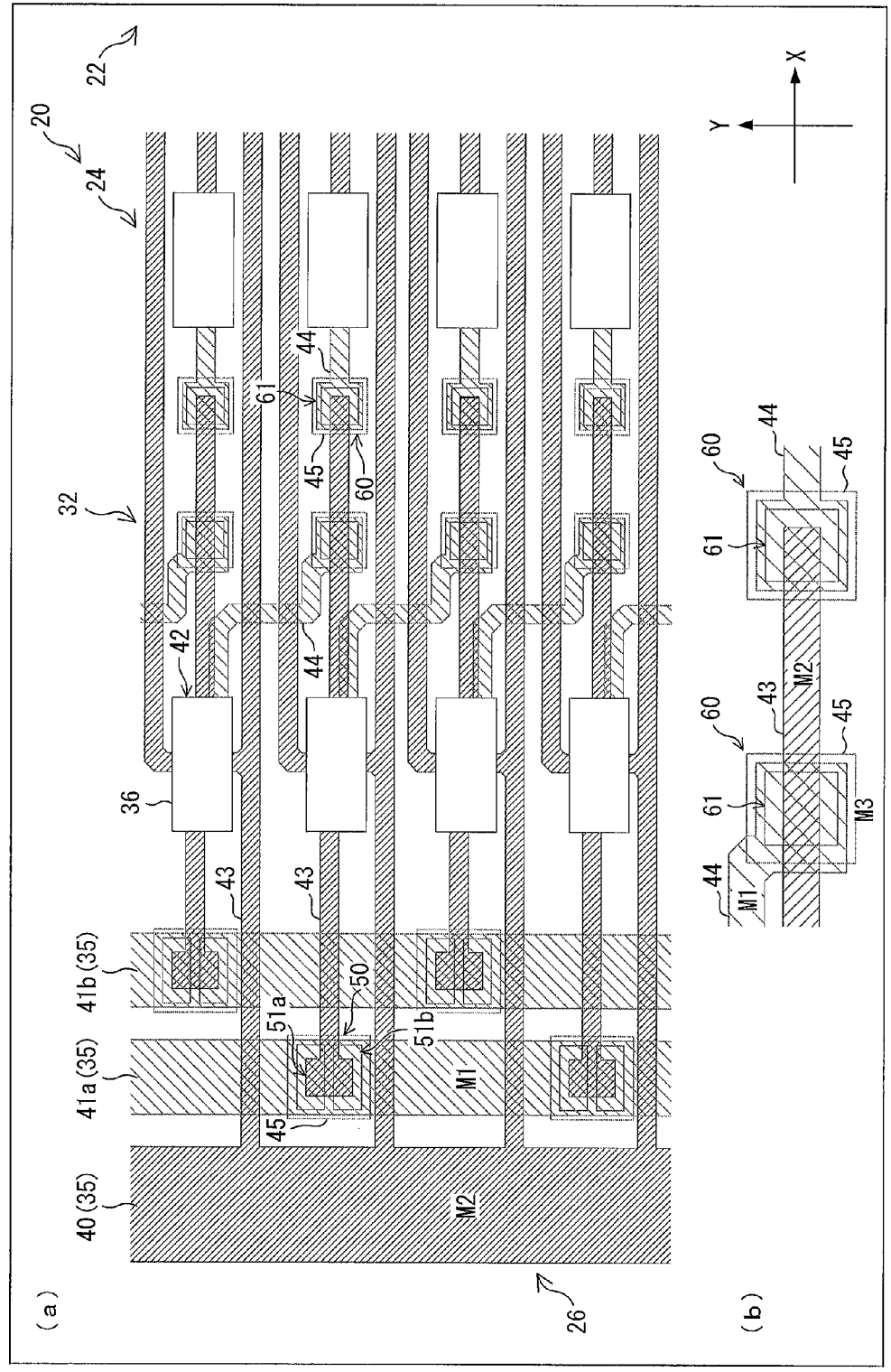
Figure 2:
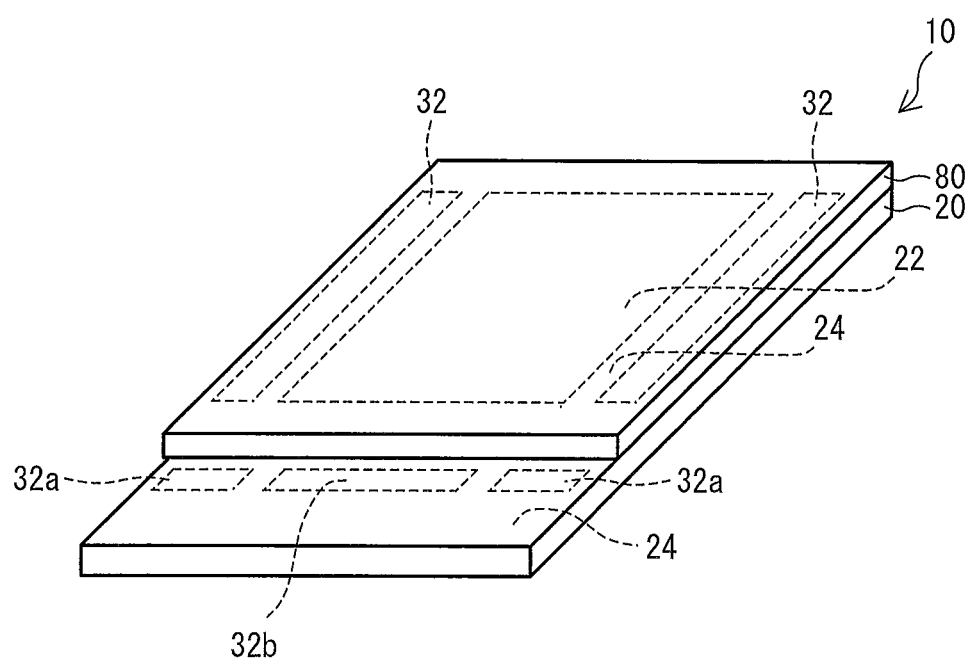

Referring to FIGS. 1 to 7, the following will describe an embodiment in accordance with the present invention.
(Display Device)
FIG. 2 is a side view illustrating a schematic arrangement of a major part of a display device in accordance with the present embodiment.

As illustrated in FIG. 2, a display device 10 includes an active matrix substrate 20 and a counter substrate 80 which are disposed to face each other with intervening sealing.

The counter substrate 80 has thereon a counter electrode, color filters, etc. (not shown). Meanwhile, the active matrix substrate 20 has pixel electrodes, display driver TFT elements, etc. (not shown) which are disposed in a matrix manner in a display area 22. Scan signal line drive circuits 32 are provided monolithically in the right and left portions of the frame area 24 so as to sandwich the display area 22.

Note that the locations of the scan signal line drive circuits 32 are by no means limited in any particular manner. For example, as another embodiment, the scan signal line drive circuits 32 may be provided, as scan signal line drive circuits 32a and 32b, where the active matrix substrate 20 does not overlap the counter substrate 80 in FIG. 2. In addition, both the scan signal line drive circuits 32 in FIG. 2 and the scan signal line drive circuits 32a and 32b may be provided.

The scan signal line drive circuits 32 are provided so as to overlap a black matrix that is provided on the counter substrate 80 to prevent external light from causing malfunction. When the scan signal line drive circuits 32 are provided as the scan signal line drive circuits 32a and 32b, the scan signal line drive circuits 32a and 32b are preferably shielded from light in some way, for example, by disposing light blocking material, such as a light blocking tape, on the scan signal line drive circuits 32a and 32b.

Note that since the active matrix substrate 20 has a substantially similar schematic arrangement to that of the active matrix substrate 20 described earlier in reference to FIG. 9, for convenience of description, members having the same functions are given the same reference numerals, and their specific description is omitted.

The following will describe the scan signal line drive circuits 32 in detail.
(Scan Signal Line Drive Circuit)

(a) of FIG. 1 is a layout drawing representing an arrangement of a major part of a scan signal line drive circuit in accordance with the present embodiment. (b) of FIG. 1 is a partial enlarged view representing an arrangement of a switching section in the scan signal line drive circuit shown in (a) of FIG. 1.

Note that the switching section is an example of a connecting section which connects a line (wire) formed in a layer to a line (wire) formed in another layer. The switching section is used to distinguish a connecting section which connects a branch line (described below) and a connecting line from a connecting section which connects a branch line and a stem line.

As shown in (a) of FIG. 1, the frame area 24 of the active matrix substrate 20 has therein the scan signal line drive circuits 32 and wiring 35 for the scan signal line drive circuits.

A plurality of circuit sections 36 are provided as the scan signal line drive circuits 32, each circuit section 36 including a driver TFT element 42 formed therein.

In addition, a low-voltage power supply wire 40 as a stem line, a first clock wire 41a as another stem line, and a second clock wire 41b as a further stem line are provided as the wiring 35 in directions Y of the active matrix substrate 20. Specifically, one low-voltage power supply wire 40, one first clock wire 41a, and one second clock wire 41b are provided in this order from the substrate perimeter 26 side toward the display area 22 side.

Note that the display area 22 is an area in which display driver TFT elements (not shown) as switching elements and pixel electrodes (not shown) connected to the display driver TFT elements are provided in a matrix manner.

In addition, in order to connect the wiring 35 and the driver TFT element 42 provided in each circuit section 36, branch lines 43, an example of second lines, are provided in directions X of the active matrix substrate 20. The low-voltage power supply wire 40 as the wiring 35 supplies a low-voltage signal to the driver TFT elements 42 via the branch lines 43 which are provided so as to extend in directions X from the low-voltage power supply wire 40. Note that the low-voltage signal is a signal supplied to a gate electrode of the TFT element 42 to turn off the TFT element 42. Meanwhile, the first clock wire 41a and the second clock wire 41b as the wiring 35 supply clock signals to the driver TFT elements 42 via the branch lines 43. Note that in each connecting section 50 where a branch line 43 is connected to either the first clock wire 41a or the second clock wire 41b, there are provided two contact holes 51a and 51b, and the first clock wire 41a or the second clock wire 41b is electrically connected to the branch line 43 via a connecting conductor 45.

In addition, a branch line 43 which is electrically connected to one first clock wire 41a or one second clock wire 41b is provided for each stage which is formed by providing a plurality of circuit sections 36 in directions X. Via this branch line 43, one of a first clock signal and a second clock signal is supplied from a corresponding one of the first clock wire 41a and the second clock wire 41b.

Note that between adjacent circuit sections 36 in the same stage, there is provided a connecting line 44, as an example of first lines, which is electrically connected to a corresponding one of the branch lines 43. Via this connecting line 44, the one of the first and second clock signals is supplied to some of the circuit sections 36.

In addition, there is provided a connecting line 44 between different stages. Via this connecting line 44, the other one of the first and second clock signals is supplied from a branch line 43 of another stage.

This arrangement includes fewer branch lines 43, and hence better restrains yield reduction, than an arrangement in which each stage has two branch lines 43 electrically connected to the first clock wire 41a and the second clock wire 41b respectively.

A contact hole 61 is provided in each switching section 60 of one of the branch lines 43 and a corresponding one of the connecting lines 44. The branch line 43 and the connecting line 44 are electrically connected to each other via a connecting conductor 45. Note that as shown in (b) of FIG. 1, two sides of the branch line 43 which specify a width of the branch line 43 are disposed in the contact hole 61 in planar view. Therefore, the width of the branch line 43 is constant and does not expand in the switching section 60.

The following will describe an electrically conductive material used for each line (wire).

(Electrically Conductive Material)

The first clock wire 41a and the second clock wire 41b, both extending in directions Y, are provided in a different layer from the branch lines 43 and made of a first electrically conductive material M1 of which scan signal lines 30 (see FIG. 9) are also made.

Meanwhile, the low-voltage power supply wire 40 extending in directions Y and the branch lines 43 extending in directions X are made of a second electrically conductive material M2 of which data signal lines 31 (see FIG. 9) are also made.

In addition, the branch lines 43 and the connecting lines 44 are provided in different layers. The connecting lines 44 are made of the first electrically conductive material M1. The connecting conductors 45 are made of a third electrically conductive material M3 of which the pixel electrodes are also made.

Note that a single layer film of aluminum alloy film (Al) may be used as the first electrically conductive material M1, a laminated film of a titanium (Ti) film and an aluminum (Al) film may be used as the second electrically conductive material M2, and an ITO (indium tin oxide) film may be used as the third electrically conductive material M3. The present embodiment is by no means limited to this. For example, IZO (indium zinc oxide) may be used as the third electrically conductive material M3. In addition, the connecting conductors 45 are by no means limited to the material of which the pixel electrodes are made. The connecting conductors 45 may be made of an electrically conductive material of which a common electrode is made when, the common electrode is formed on the same substrate as the pixel electrodes in, for example, FFS (fringe field switching) mode, IPS (in-plane switching) mode, etc.

In the present embodiment, the low-voltage power supply wire 40 is made of the second electrically conductive material M2, but may be made of the first electrically conductive material M1. In that case, the low-voltage power supply wire 40 may be connected to the branch lines 43 made of the second electrically conductive material M2 via connecting conductors 45 in contact holes.

Figure 3:
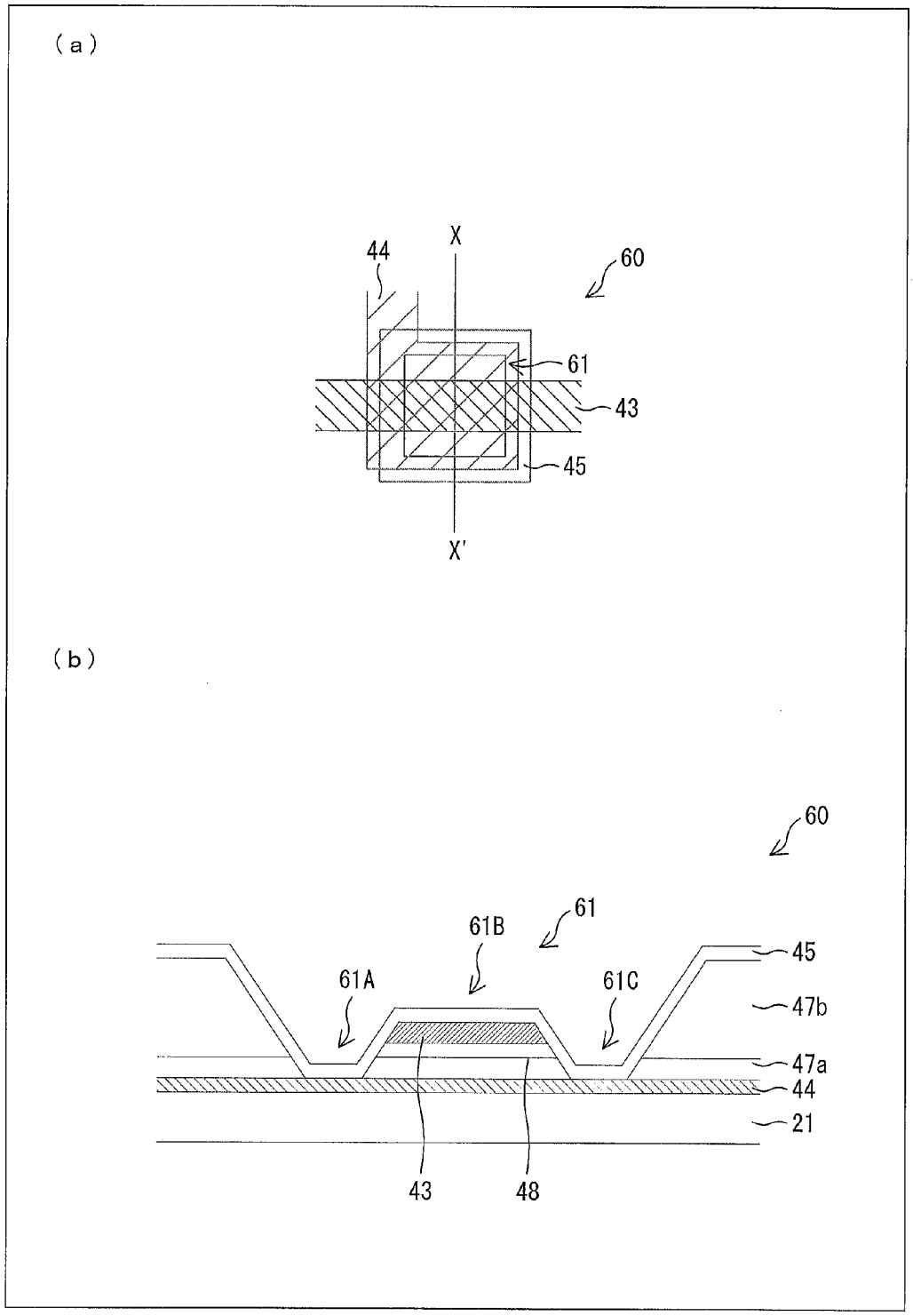
Figure 4:
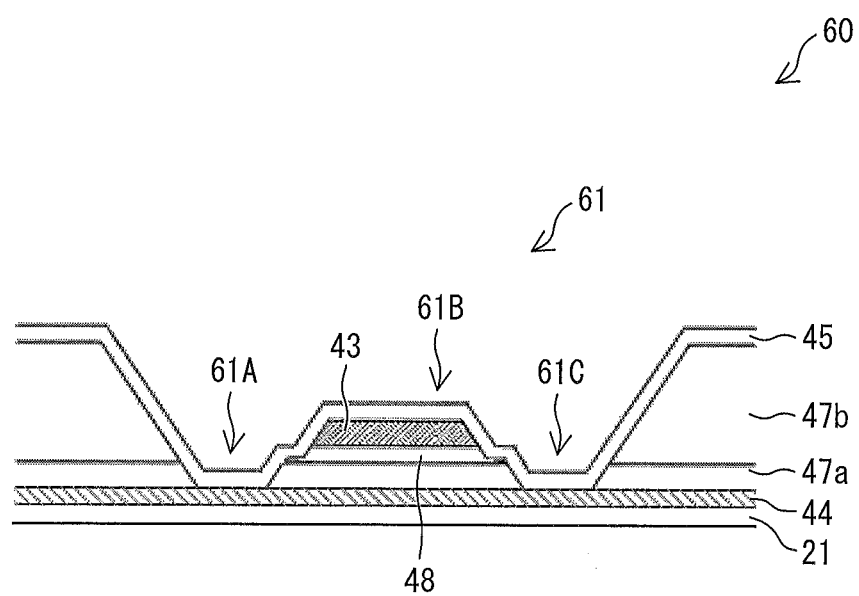
FIG. 4 is a cross-sectional view of the switching section shown in (a) of FIG. 3, taken along line X-X'.

Referring to FIGS. 3 to 4, the following will describe an arrangement of the switching section 60 in more detail.

(Switching Section)

An arrangement of a conventional switching section will be described first.

(a) of FIG. 11 is a plan view illustrating an arrangement of a conventional switching section, and (b) of FIG. 11 is a cross-sectional view of the switching section shown in (a) of FIG. 11, taken along line X-X'.

As shown in (a) of FIG. 11, there are provided two contact holes 261a and 261b in a switching section 260 of a branch line 243 and a connecting line 244. The branch line 243 and the connecting line 244 are electrically connected to each other via a connecting conductor 245.

Note that the branch line 243 and the connecting line 244 have their width expanded in the switching section 260.

Specifically, as shown in (b) of FIG. 11, the connecting line 244, an insulating layer 247a, the branch line 243, an insulating layer 247b, and the connecting conductor 245 are sequentially laminated on an insulating substrate 221 made from, for example, a glass substrate. The branch line 243 and the connecting line 244 do not overlap in planar view. Note that a semiconductor layer 248 is formed between the insulating layer 247a and the branch line 243.

The connecting conductor 245 and the branch line 243 are electrically connected to each other in the contact hole 261a. Meanwhile, the connecting conductor 245 and the connecting line 244 are electrically connected to each other in the contact hole 261b.

The branch line 243 and the connecting line 244 do not overlap in planar view and are electrically connected to the connecting conductor 245 in the contact holes 261a and 261b respectively. Thus, the switching section 260 occupies large area.

(a) of FIG. 3 is a plan view illustrating an arrangement of a switching section in accordance with the present embodiment, and (b) of FIG. 3 is a cross-sectional view of the switching section shown in (a) of FIG. 3, taken along line X-X'.

As shown in (a) of FIG. 3, a contact hole 61 is provided in each switching section 60 of one of the branch lines 43 and a corresponding one of the connecting lines 44. The branch line 43 and the connecting line 44 are electrically connected to each other via a connecting conductor 45 in the contact hole 61.

Note that the two sides of the branch line 43 which specify the width of the branch line 43 are disposed in the contact hole 61 in planar view. In other words, the width of the branch line 43 is constant and does not expand in the switching section 60.

Specifically, as shown in (b) of FIG. 3, the connecting line (first line) 44, an insulating layer (first insulating layer) 47a, the branch line 43 (second line), an insulating layer (second insulating layer) 47b, and the connecting conductor 45 are sequentially laminated on an insulating substrate 21 made from, for example, a glass substrate. The branch line 43 and the connecting line 44 overlap in planar view. Note that a semiconductor layer 48 is formed between the insulating layer 47a and the branch line 43 to prevent a step from forming and causing a discontinuity in the connecting conductor 45.

The contact hole 61 is made up of a second contact hole cut through the first insulating layer 47a and a first contact hole cut through the second insulating layer 47b.

To describe in detail, the contact hole 61 is divided into three partial contact holes 61A, 61B, and 61C. The contact holes 61A and 61C correspond to the second contact hole, whilst the contact hole 61B and upper layers of the contact holes 61A and 61C correspond to the first contact hole.

The connecting conductor 45 and the connecting line 44 are electrically connected to each other in the contact holes 61A and 61C. The connecting conductor 45 and the branch line 43 are electrically connected to each other in the contact hole 61B which is formed between the contact holes 61A and 61C.

In other words, the two sides of the branch line 43 which specify the width of the branch line 43 are disposed in the contact hole 61 in planar view.

According to the arrangement, the switching section 60 in accordance with the present embodiment occupies less area than the conventional switching section.

In addition, since the two sides of the branch line 43 which specify the width of the branch line 43 are disposed in the contact hole 61, the area of the switching section 60 is unlikely to vary even when the branch line 43 is out of alignment with respect to the connecting line 44 in photolithography during manufacture.

Note that as illustrated in FIG. 4, the insulating layer 47a may be formed to have steps in a tapered section which is from the connecting line 44 to the branch line 43. FIG. 4 is a cross-sectional view of the switching section shown in (a) of FIG. 3, taken along line X-X'.

Note that, for example, when the insulating layer 47a is etched by using the branch line 43 and the insulating layer 47b as a mask or when the insulating layer 47b has a double-layered structure of an organic film (e.g., an acrylic resin film) and an inorganic film (e.g., silicon nitride film) so that the lower, inorganic film and the insulating layer 47a are etched by using a pattern of the upper, organic film and the branch line 43 as a mask, the branch line 43 will act as an etching stopper, and the insulating layer 47a under the branch line 43 remain unetched. However, since the branch line 43, acting as a mask, is not etched, the insulating layer 47a under the branch line 43 can be etched quickly. In that case, a reverse tapered shape develops where the insulating layer 47a recedes excessively under the branch line 43, which causes a discontinuity to develop in the connecting conductor 45 relatively likely.

In the present embodiment, the semiconductor layer 48, which has a slower etching speed than the insulating layer 47a, is provided between the branch line 43 and the insulating layer 47a. The provision of the semiconductor layer 48 prevents the insulating layer 47a under the branch line 43 to be etched quickly. In other words, it is possible to form the edge of the pattern of the insulating layer 47a in a forward tapered shape and thus reduce the risk of discontinuity in the connecting conductor 45.

The semiconductor layer 48 is formed between the insulating layer 47a and the branch line 43 in the present embodiment. The present embodiment is by no means limited to this. No semiconductor layer 48 may be formed.

Figure 5:
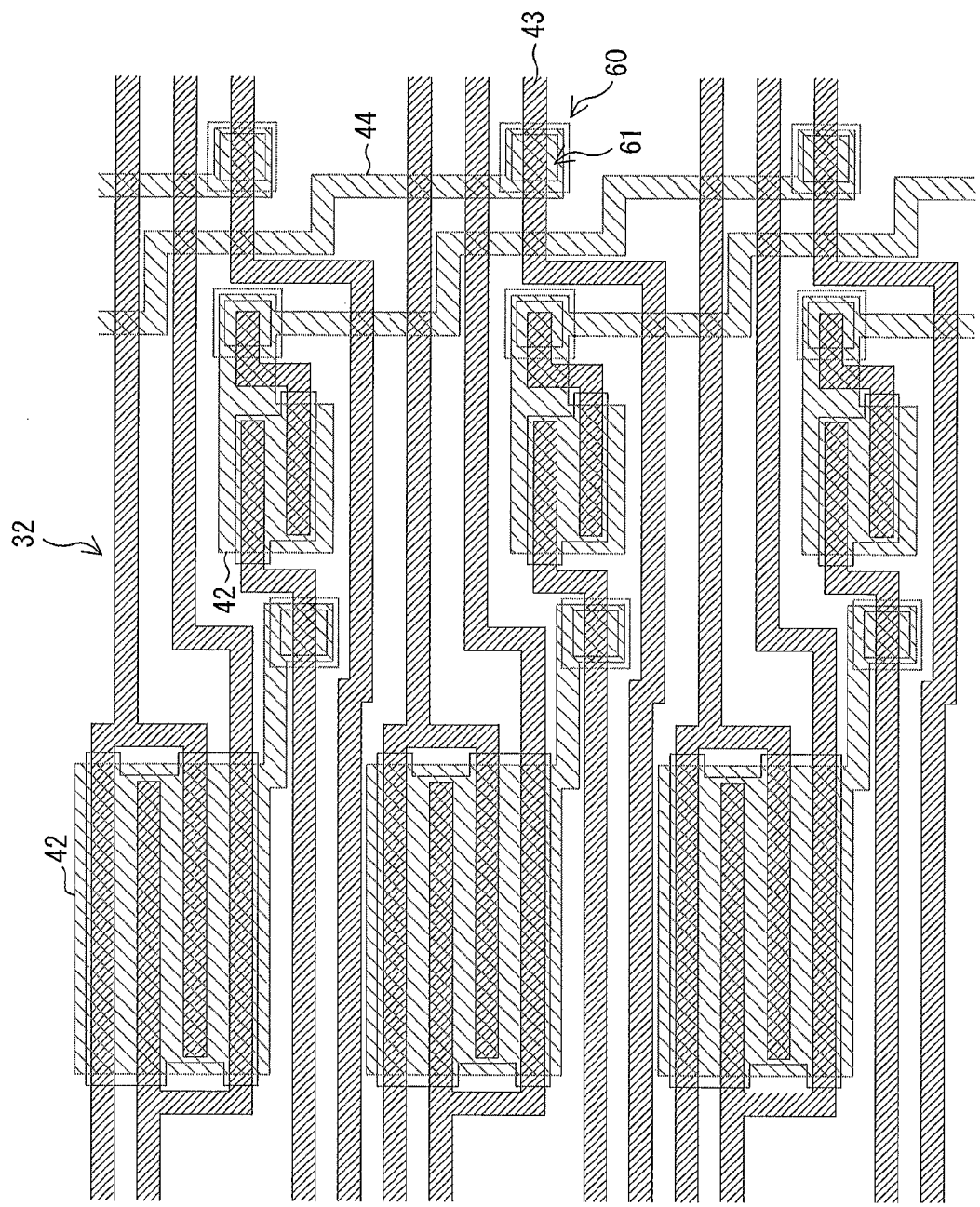
FIG. 5 is a layout diagram representing an arrangement of a major part of a scan signal line drive circuit in accordance with embodiment 1.

FIG. 5 is a layout diagram representing an arrangement of a major part of a scan signal line drive circuit in accordance with the present embodiment.

As illustrated in FIG. 5, a plurality of contact holes 61 are provided in each scan signal line drive circuit 32. In one of the contact holes 61, the branch line 43 and the connecting line 44 are electrically connected to each other, and the driver TFTs 42 are electrically connected to each other.

Note that since the two sides specifying the width of the branch line 43 are disposed in the contact hole 61 in planar view, the contact hole 61 occupies less area, and so does the scan signal line drive circuit 32. Thus, narrowing of the frame area is facilitated.

Furthermore, it is possible to widen a space separating the contact hole 61 from the lines (wires) and therefore reduce leak between the lines. Thus, it is possible to improve yield.

Figure 6:
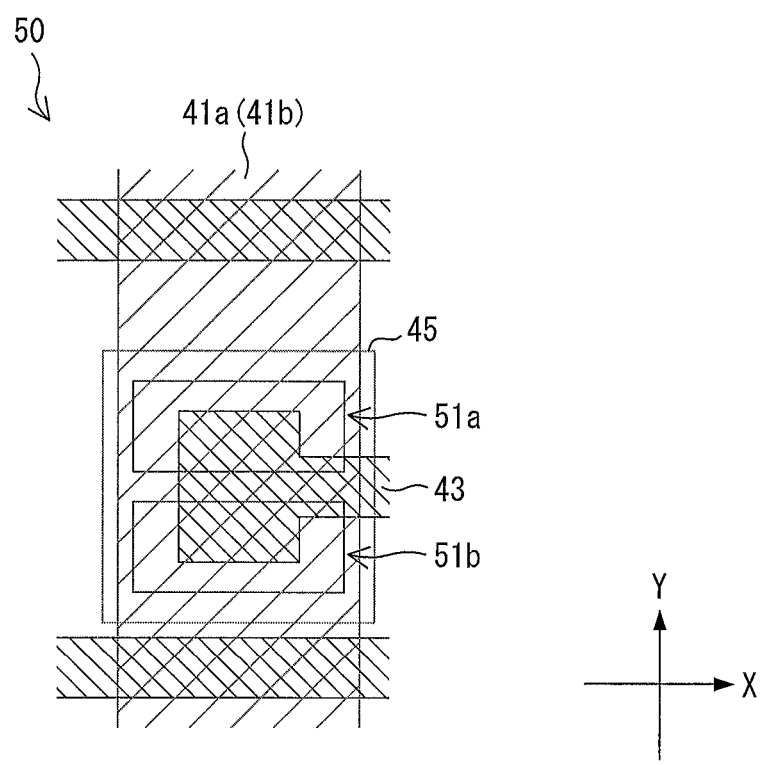
FIG. 6 is a plan view illustrating an arrangement of a connecting section in accordance with embodiment 1.

Referring to FIG. 6, the following will describe in more detail an arrangement of the connecting section 50 where the branch line 43 is connected to the first clock wire 41a (or the second clock wire 41b) as the stem lines 35.
(Connecting Section)

The first clock wire 41a and the second clock wire 41b as the stem lines 35 are formed so as to be wider than the branch lines 43 in order to reduce signal delay caused by increased resistance.

Note that there is a case where a plurality of contact holes are provided for one relatively wide line (wire) to obtain a connecting section with decreased resistance and improved reliability.

FIG. 6 is a plan view illustrating an arrangement of a connecting section in accordance with the present embodiment.

As illustrated in FIG. 6, the two contact holes 51a and 51b are provided in the connecting section 50 of the branch line 43 as an example of the second lines and the first clock wire 41a (or the second clock wire 41b) as an example of both the first lines and the stem lines. The branch line 43 and the first clock wire 41a (or the second clock wire 41b) are electrically connected to each other via the connecting conductor 45.

Specifically, the two contact holes 51a and 51b are provided in directions Y. A part of the branch line 43 is disposed in the contact hole 51a, whilst another part is disposed in the contact hole 51b, both in planar view. In addition, one of the sides specifying the width of the branch line 43 is disposed in the contact hole 51a in planar view, whilst the other side is disposed in the contact hole 51b in planar view.

The branch line 43 and the first clock wire 41a (or the second clock wire 41b) are electrically connected to each other in the contact hole 51a via the connecting conductor 45. In the contact hole 51b, the branch line 43 and the first clock wire 41a (or the second clock wire 41b) are likewise electrically connected to each other via the connecting conductor 45. In other words, the branch line 43 and the first clock wire 41a (or the second clock wire 41b) are electrically connected at two sites. Accordingly, the branch line 43 and the first clock wire 41a (or the second clock wire 41b) can be unfailingly electrically connected, improving reliability.

In addition, the sum of the areas of the two sites of the connecting section is unlikely to vary even if the branch line 43 is out of alignment with respect to the stem line 35 or the branch line 43 is out of alignment with respect to the contact holes 51a and 51b.

In addition, the branch line 43 is confined to the contact holes 51a and 51b. Hence, in the arrangement including the two contact holes 51a and 51b, the connecting section 50 occupies less area, and so does the scan signal line drive circuit 32. Thus, the arrangement facilitates narrowing of the frame area.

In the present embodiment, the two contact holes 51a and 51b are provided in the connecting section 50 of the branch line 43 and the first clock wire 41a (or the second clock wire 41b), and the first clock wire 41a (or the second clock wire 41b) and the branch line 43 are electrically connected via the connecting conductor 45. The present embodiment is by no means limited to this. Alternatively, the connecting section 50 may be arranged, for example, in the same manner as the switching section 60 described above in reference to FIG. 3.

In addition, in the present embodiment, one contact hole is provided for one line (wire) in the switching section 60 of the branch line 43 and the connecting line 44. The present embodiment is by no means limited to this. A plurality of contact holes may be provided for one line (wire). The switching section 60 may be arranged, for example, in the same manner as the connecting section 50.

The following will describe variation examples of the switching section 60 in reference to FIG. 7.

Variation Example 1

Referring to (a) of FIG. 7, the following will describe a variation example related to a display device in accordance with the present invention.

Note that for convenience in description, members that have the same function as members of embodiment 1 are indicated by the same reference numerals/symbols and description thereof is omitted.

The present variation example is an example of another arrangement of the switching section 60 in accordance with embodiment 1.

As shown in (a) of FIG. 7, a contact hole 61 is provided in a switching section 60 of a branch line 43 and a connecting line 44. The branch line 43 and the connecting line 44 are electrically connected to each other via a connecting conductor 45.

Note that in the switching section 60, one of sides of the branch line 43 which specify a width of the branch line 43 is disposed in the contact hole 61 in planar view. In addition, the width of the branch line 43 is constant and does not expand in the switching section 60.

According to the arrangement, the switching section 60 occupies less area, and so does the scan signal line drive circuit 32. Thus, the arrangement facilitates narrowing of the frame area.

Furthermore, it is possible to widen a space separating the lines (wires) from each other and therefore reduce leak between the lines. Thus, it is possible to improve yield.

Variation Example 2

Referring to (b) of FIG. 7, the following will describe a variation example related to a display device in accordance with the present invention.

Note that for convenience in description, members that have the same function as members of embodiment 1 are indicated by the same reference numerals/symbols and description thereof is omitted.

The present variation example is an example of another arrangement of the switching section 60 in accordance with embodiment 1.

As shown in (b) of FIG. 7, a contact hole 61 is provided in a switching section 60 of a branch line 43 and a connecting line 44. The branch line 43 and the connecting line 44 are electrically connected to each other via a connecting conductor 45.

Note that in the switching section 60, one of sides of the branch line 43 which specify a width of the branch line 43 is disposed in the contact hole 61 in planar view.

In addition, the branch line 43 has a protrusion part 72 and has its width expanded, in the contact hole 61 in planar view.

The provision of the protrusion part 72 to the branch line 43 facilitates adjustment of area of the switching section 60. For example, when the branch line 43 made of the second electrically conductive material M2 and the connecting conductor 45 made of the third electrically conductive material M3 have a greater contact resistance than the connecting line 44 made of the first electrically conductive material M1 and the connecting conductor 45 made of the third electrically conductive material M3, the additional provision of the protrusion part 72 adds to contact area and thereby optimizes an overall contact resistance.

Variation Example 3

Referring to (c) of FIG. 7, the following will describe a variation example related to a display device in accordance with the present invention.

Note that for convenience in description, members that have the same function as members of embodiment 1 are indicated by the same reference numerals/symbols and description thereof is omitted.

The present variation example is an example of another arrangement of the switching section 60 in accordance with embodiment 1.

As shown in (c) of FIG. 7, a contact hole 61 is provided in a switching section 60 of a branch line 43 and a connecting line 44. The branch line 43 and the connecting line 44 are electrically connected to each other via a connecting conductor 45.

Note that in the switching section 60, two sides of the connecting line 44 which specify a width of the connecting line 44 are disposed in the contact hole 61 in planar view, whilst one of sides of the branch line 43 which specify a width of the branch line 43 is disposed in the contact hole 61 in planar view. In addition, the widths of the branch line 43 and the connecting line 44 are constant and do not expand in the switching section 60.

According to the arrangement, the switching section 60 occupies less area, and so does the scan signal line drive circuit 32. Thus, the arrangement facilitates narrowing of the frame area.

Furthermore, it is possible to widen a space separating the lines (wires) from each other and therefore reduce leak between the lines. Thus, it is possible to improve yield.

Variation Example 4

Referring to (d) of FIG. 7, the following will describe a variation example related to a display device in accordance with the present invention.

Note that for convenience in description, members that have the same function as members of embodiment 1 are indicated by the same reference numerals/symbols and description thereof is omitted.

The present variation example is an example of another arrangement of the switching section 60 in accordance with embodiment 1.

As shown in (d) of FIG. 7, contact holes 61a and 61b are provided in a switching section 60 of a branch line 43 and a connecting line 44. The branch line 43 and the connecting line 44 are electrically connected to each other via a connecting conductor 45. Note that the contact holes 61a and 61b are provided side by side in a direction in which the connecting line 44 extends.

The connecting conductor 45 and the branch line 43 are electrically connected to each other in the contact hole 61*b*, whereas the connecting conductor 45 and the connecting line 44 are electrically connected to each other in the contact hole 61*a*. Note that two sides of the branch line 43 which specify a width of the branch line 43 are disposed in the contact hole 61*b* in planar view. In other words, the width of the branch line 43 is constant and does not expand in the switching section 60.

According to the arrangement, the switching section 60 occupies less area, and so does the scan signal line drive circuit 32. Thus, the arrangement facilitates narrowing of the frame area.

Furthermore, it is possible to widen a space separating the lines (wires) from each other and therefore reduce leak between the lines. Thus, it is possible to improve yield.

Variation Example 5

Referring to (e) of FIG. 7, the following will describe a variation example related to a display device in accordance with the present invention.

Note that for convenience in description, members that have the same function as members of embodiment 1 are indicated by the same reference numerals/symbols and description thereof is omitted.

The present variation example is an example of another arrangement of the switching section 60 in accordance with embodiment 1.

As shown in (e) of FIG. 7, contact holes 61*a* and 61*b* are provided in a switching section 60 of a branch line 43 and a connecting line 44. The branch line 43 and the connecting line 44 are electrically connected to each other via a connecting conductor 45. Note that the contact holes 61*a* and 61*b* are provided side by side in a direction in which the branch line 43 extends.

The connecting conductor 45 and the branch line 43 are electrically connected to each other in the contact hole 61*b*, whereas the connecting conductor 45 and the connecting line 44 are electrically connected to each other in the contact hole 61*a*. Note that two sides of the connecting line 44 which specify a width of the connecting line 44 are disposed in the contact hole 61*b* in planar view. In other words, the width of the connecting line 44 is constant and does not expand in the switching section 60.

According to the arrangement, the switching section 60 occupies less area, and so does the scan signal line drive circuit 32. Thus, the arrangement facilitates narrowing of the frame area.

Furthermore, it is possible to widen a space separating the lines (wires) from each other and therefore reduce leak between the lines. Thus, it is possible to improve yield.

Variation Example 6

Referring to (f) of FIG. 7 and (g) of FIG. 7, the following will describe a variation example related to a display device in accordance with the present invention. (f) of FIG. 7 is a drawing representing a switching section 60 of the present variation example, and (g) of FIG. 7 is a cross-sectional view of (f) of FIG. 7 taken along line X-X'.

Note that for convenience in description, members that have the same function as members of embodiment 1 are indicated by the same reference numerals/symbols and description thereof is omitted.

The present variation example is an example of another arrangement of the switching section 60 in accordance with embodiment 1.

As shown in (f) of FIG. 7 and (g) of FIG. 7, in the present variation example, two sides of a connecting line (first line) 44 which specify a width of the connecting line 44 are disposed in a contact hole 61 in planar view.

In other words, the sides which specify the width of the connecting line 44 as the first line are disposed in a first contact hole which is the contact hole 61 provided in the second insulating layer 47*b* in planar view.

According to the arrangement, the switching section 60 occupies less area. Thus, as mentioned earlier, narrowing of the frame area and yield improvement are facilitated.

OTHER ARRANGEMENT

The following will describe another arrangement related to a display device in accordance with the present invention in reference to FIG. 8.

Note that for convenience in description, members that have the same function as members of embodiment 1 are indicated by the same reference numerals/symbols and description thereof is omitted.

The following arrangement represents another arrangement of the switching section 60 in accordance with embodiment 1.

An arrangement of a conventional switching section will be described first.

(a) of FIG. 12 is a plan view illustrating an arrangement of a conventional switching section, and (b) of FIG. 12 is a cross-sectional view of the switching section shown in (a) of FIG. 12, taken along line X-X'.

As shown in (a) of FIG. 12, a contact hole 361 is provided in a switching section 360 of a branch line 343 and a connecting line 344. The branch line 343 and the connecting line 344 are electrically directly connected to each other via the contact hole 361.

Note that the branch line 343 and the connecting line 344 have their widths expanded in the switching section 360.

As shown in (b) of FIG. 12, the connecting line 344, an insulating layer 347*a*, the branch line 343, and an insulating layer 347*b* are sequentially laminated on an insulating substrate 321 made from, for example, a glass substrate. The branch line 343 and the connecting line 344 are electrically directly connected to each other via the contact hole 361.

Since the branch line 343 and the connecting line 344 both have their widths expanded in the switching section 360, the switching section 360 occupies large area.

(a) of FIG. 8 is a plan view illustrating an arrangement of a switching section in accordance with the present arrangement, and (b) of FIG. 8 is a cross-sectional view of the switching section shown in (a) of FIG. 8, taken along line X-X'.

As shown in (a) of FIG. 8, a contact hole 61 is provided in a switching section 60 of a branch line 43 and a connecting line 44. The branch line 43 and the connecting line 44 are electrically directly connected via the contact hole 61.

Note that in the switching section 60, two sides of the connecting line 44 which specify a width of the connecting line 44 are disposed in the contact hole 61 in planar view. In other words, the width of the connecting line 44 is constant and does not expand in the switching section 60.

Specifically, as shown in (b) of FIG. 8, the connecting line 44, an insulating layer 47*a*, the branch line 43, and an insulating layer 47*b* are sequentially laminated on an insulating substrate 21 made from, for example, a glass substrate. The branch line 43 and the connecting line 44 are electrically directly connected via the contact hole 61.

Note that the width of the connecting line 44 does not expand in the switching section 60.

According to the arrangement, the switching section 60 occupies less area, and so does the scan signal line drive circuit 32. Thus, the arrangement facilitates narrowing of the frame area.

Furthermore, it is possible to widen a space separating the lines (wires) from each other and therefore reduce leak between the lines. Thus, it is possible to improve yield.

In other words, an active matrix substrate in accordance with the another arrangement is an active matrix substrate including, on an insulating substrate, switching elements and pixel electrodes in a matrix manner, the pixel electrodes being connected to the switching elements, the pixel electrodes being provided in a matrix manner in a display area of the insulating substrate, a frame area being provided so as to surround the display area, the frame area having a drive circuit for driving the switching elements, the drive circuit including a plurality of circuit sections having respective drive elements, the frame area having, on the insulating substrate, a first line and a second line, provided sequentially, for supplying signals to the drive elements, a first insulating layer being provided between the first line and the second line, the first insulating layer having a contact hole, the first line and the second line being directly connected to each other without another intervening connecting conductor in the contact hole, at least one of sides of at least one of the first line and the second line being disposed in the contact hole in planar view, the sides specifying a width of the one of the first line and the second line.

According to the arrangement, narrowing of the frame area is facilitated as mentioned earlier. In addition, it is possible to restrain an increase of a resistance in a connection of a connecting line and a branch line.

Furthermore, since no connecting conductor is used, it is possible to reduce defects attributable to a connecting conductor.

For example, it is possible to reduce discontinuities of a line (a wire) and a connecting conductor on an edge of an insulating film, and discontinuities of a connecting conductor caused by a spacer material (fibrous glass, etc.) which contaminates a sealant when sealing is located in the connecting section.

Note that the present invention is not limited to the description of the embodiments above, but may be altered by a skilled person within the scope of the claims. An embodiment based on a proper combination of technical means disclosed in different embodiments is encompassed in the technical scope of the present invention.

An active matrix substrate in accordance with the present invention is an active matrix substrate including, on an insulating substrate, switching elements and pixel electrodes in a matrix manner, the pixel electrodes being connected to the switching elements, the pixel electrodes being provided in a matrix manner in a display area of the insulating substrate, a frame area being provided so as to surround the display area, the frame area having a drive circuit for driving the switching elements, the drive circuit including a plurality of circuit sections having respective drive elements, the frame area having, on the insulating substrate, a first line and a second line, provided sequentially, for supplying signals to the drive elements, a first insulating layer being provided between the first line and the second line, a second insulating layer being provided so as to cover the first insulating layer and at least one of the first line and the second line, in a connecting section in which the first line and the second line are connected to each other, the second insulating layer having a first contact hole, and at least one of sides of at least one of the first line and the second line being disposed in the first contact hole in planar view, the sides specifying a width of the one of the first line and the second line.

According to the arrangement, the connecting section where the first line and the second line are connected to each other occupies less area, and so does the drive circuit. Thus, the arrangement facilitates narrowing of the frame area.

Furthermore, it is possible to widen a space separating the lines (wires) from each other and therefore reduce leak between the lines. Thus, it is possible to improve yield.

In addition, an active matrix substrate in accordance with the present invention is preferably such that the first insulating layer has a second contact hole in the connecting section.

In addition, an active matrix substrate in accordance with the present invention is preferably such that the first line and the second line are electrically connected to each other via a connecting conductor disposed in the first and second contact holes.

In addition, an active matrix substrate in accordance with the present invention is preferably such that the connecting conductor is made of a material identical to a material of which the pixel electrodes are made.

According to the arrangement, it is possible to form the connecting conductor and the pixel electrodes by patterning a single conductive layer and also to electrically connect the first line and the second line to each other via the connecting conductor. Therefore, the arrangement simplifies manufacturing steps.

In addition, an active matrix substrate in accordance with the present invention is preferably such that one of the first line and the second line is a branch line connected to one of the drive elements; the other one of the first line and the second line is a connecting line connected to the branch line; and the connecting line is connected to another one of the drive elements which is in a stage different from a stage which includes the one of the drive elements to which the branch line is connected.

According to the arrangement, a region where the connecting line and the branch line for supplying a signal to the drive elements are connected to each other occupies less area, and so does the drive circuit. Thus, the arrangement facilitates narrowing of the frame area.

In addition, the arrangement includes fewer branch lines, and hence better restrains yield reduction.

In addition, an active matrix substrate in accordance with the present invention is preferably such that one of the first line and the second line is a branch line connected to one of the drive elements; the other one of the first line and the second line is a connecting line connected to the branch line; and the connecting line is connected to another one of the drive elements which is in a stage identical to a stage which includes the one of the drive elements to which the branch line is connected.

According to the arrangement, a region where the connecting line and the branch line for supplying a signal to the drive elements are connected to each other occupies less area, and so does the drive circuit. Thus, the arrangement facilitates narrowing of the frame area.

In addition, an active matrix substrate in accordance with the present invention is preferably such that for the connecting line and the branch line which are connected to each other in the connecting section, there is provided a wire made of a material identical to a material of which the branch line is made, the wire being disposed either in an area located on a top side or a bottom side of the branch line or in areas on the top and bottom sides in planar view, with a direction in which the branch line extends being taken as a lateral direction.

According to the arrangement, it is possible to widen a space separating the lines (wires) from each other and therefore reduce leak between the lines. Thus, it is possible to improve yield.

In addition, an active matrix substrate in accordance with the present invention is preferably such that both of the sides of either one of the first line and the second line are disposed in the first contact hole in planar view, the sides specifying the width of the one of the first line and the second line.

According to the arrangement, the connecting section where the first line and the second line are connected to each other occupies even less area, and so does the drive circuit. Thus, the arrangement facilitates narrowing of the frame area.

In addition, it is possible to widen a space separating the lines (wires) from each other and thereby improve yield.

In addition, for example, if the two sides which specify the width of the first line are disposed in the contact hole, the area of the connecting section is unlikely to vary even when the first line is out of alignment with respect to the second line or the contact hole in photolithography during manufacture.

In addition, an active matrix substrate in accordance with the present invention is preferably such that only one of the sides of either one of the first line and the second line is disposed in the first contact hole in planar view, the sides specifying the width of the one of the first line and the second line.

According to the arrangement, the connecting section where the first line and the second line are connected to each other occupies less area as mentioned earlier. Thus, the arrangement facilitates narrowing of the frame area.

Furthermore, it is possible to widen a space separating the lines (wires) from each other and thereby improve yield.

In addition, an active matrix substrate in accordance with the present invention is preferably such that at least one of the sides of each one of the first line and the second line is disposed in the first contact hole in planar view, the sides specifying the width of the one of the first line and the second line.

According to the arrangement, it is possible to enable narrowing of the frame area and yield improvement, as mentioned earlier.

In addition, an active matrix substrate in accordance with the present invention is preferably such that either one of the first line and the second line is provided so as to have the width thereof expanded in the first contact hole in planar view.

According to the arrangement, it is possible to enable narrowing of the frame area and yield improvement, as mentioned earlier.

In addition, the arrangement facilitates adjustment of the area of the connecting section. Therefore, for example, even when the second line made of a second electrically conductive material and the connecting conductor made of a third electrically conductive material have a greater contact resistance than the first line made of a first electrically conductive material and the connecting conductor made of the third electrically conductive material, it is possible to expand contact area by expanding the width and thereby to optimize an overall contact resistance. In addition, variations of contact resistance among a plurality of connecting sections can be reduced. Display quality is thus improved.

In addition, an active matrix substrate in accordance with the present invention is preferably such that a line connected in the connecting section has a width, specified by sides of the line, which is not expanded in the first contact hole, at least one of the sides being disposed in the first contact hole in planar view.

According to the arrangement, it is possible to facilitate narrowing of the frame area as mentioned earlier.

An active matrix substrate in accordance with the present invention is an active matrix substrate including, on an insulating substrate, switching elements and pixel electrodes in a matrix manner, the pixel electrodes being connected to the switching elements, the pixel electrodes being provided in a matrix manner in a display area of the insulating substrate, a frame area being provided so as to surround the display area, the frame area having a drive circuit for driving the switching elements, the drive circuit including a plurality of circuit sections having respective drive elements, the frame area having, on the insulating substrate, a first line and a second line, provided sequentially, for supplying signals to the drive elements, a first insulating layer being provided between the first line and the second line, a second insulating layer being provided so as to cover the first insulating layer and at least one of the first line and the second line, in a connecting section in which the first line and the second line are connected to each other, the second insulating layer having two first contact holes, each of the two first contact holes being provided in a direction in which either one of the first line and the second line extends, a part of the other one of the first line and the second line being disposed in each of the two first contact holes in planar view, and at least one of sides of the part of the other one of the first line and the second line being disposed in the first contact hole in planar view, the sides specifying a width of the part.

According to the arrangement, the first line and the second line are electrically connected at two sites. Therefore, the first line and the second line can be unfailingly connected, improving reliability.

In addition, as mentioned above, the connecting section occupies less area, and so does the scan signal line drive circuit. Thus, the arrangement facilitates narrowing of the frame area.

In addition, the sum of the areas of the two sites of the connecting section is unlikely to vary even if, for example, the second line is out of alignment with respect to the first line or the contact holes.

In addition, an active matrix substrate in accordance with the present invention is such that the first insulating layer has a second contact hole in the connecting section.

In addition, an active matrix substrate in accordance with the present invention is preferably such that one of the first line and the second line is a branch line connected to one of the drive elements; the other one of the first line and the second line is a stem line for externally supplying a signal to the branch line; and a plurality of the branch lines are connected commonly to the stem line.

According to the arrangement, as mentioned above, the connecting section occupies less area, and so does the scan signal line drive circuit. Thus, the arrangement facilitates narrowing of the frame area.

In addition, when the stem line and the branch line are electrically connected at two sites, the stem line and the branch line can be unfailingly connected, improving reliability.

In addition, the sum of the areas of the two sites of the connecting section is unlikely to vary even if, for example, the branch line is out of alignment with respect to the stem line or the contact hole.

In addition, an active matrix substrate in accordance with the present invention is preferably such that the switching elements and the drive elements are transistor elements.

A display device in accordance with the present invention preferably includes an active matrix substrate and a counter substrate, the active matrix substrate and the counter substrate being disposed so as to face each other.

According to the arrangement, narrowing of the frame area of the display device is facilitated.

INDUSTRIAL APPLICABILITY

The present invention enables narrowing of a frame area and improvement of reliability in an active matrix substrate. Therefore, the present invention is suitably applicable to a display device, such as a liquid crystal display device.

REFERENCE SIGNS LIST

10 Display Device
16 Insulating Substrate
20 Active Matrix Substrate
21 Insulating Substrate
22 Display Area
24 Frame Area
26 Substrate Perimeter
30 Scan Signal Line
31 Data Signal Line
32 Scan Signal Line Drive Circuit
33 Driver
34 Terminal
35 Wiring for Scan Signal Line Drive Circuit
36 Circuit Section
40 Low-voltage Power Supply Wire
41a First Clock Wire (First Line)
41b Second Clock Wire (First Line)
42 Driver TFT Element
43 Branch Line (Second Line)
44 Connecting Line (First Line)
45 Connecting Conductor
47a Insulating Layer (First Insulating Layer)
47b Insulating Layer (Second Insulating Layer)
48 Semiconductor Layer
50 Connecting Section
51 Contact Hole
60 Switching Section (Connecting Section)
61 Contact Hole
72 Protrusion Part
80 Counter Substrate

The invention claimed is:

1. An active matrix substrate, comprising, on an insulating substrate, switching elements and pixel electrodes in a matrix manner, the pixel electrodes being connected to the switching elements,
the pixel electrodes being provided in a matrix manner in a display area of the insulating substrate,
a frame area being provided so as to surround the display area,
the frame area including a drive circuit configured to drive the switching elements,
the drive circuit including a plurality of circuit sections including respective drive elements,
the frame area including, on the insulating substrate, a first line and a second line, provided sequentially, configured to supply signals to the drive elements, the first line including a portion that extends in a direction different from a direction in which the second line extends and the second line being electrically connected to a clock wire, which is configured to supply a clock signal, such that the clock signal is supplied to a corresponding one of the plurality of circuit sections,
a first insulating layer being provided between the first line and the second line,
a second insulating layer being provided so as to cover the first insulating layer and at least one of the first line and the second line,
in a connecting section in which the first line and the second line are connected to each other,
the second insulating layer including a first contact hole,
at least one of sides of at least one of the first line and the second line being disposed in the first contact hole in planar view, the sides specifying a width of the one of the first line and the second line,
the first line and the second line overlapping in the first contact hole in planar view, and
both of the sides of either one of the first line and the second line being disposed in the first contact hole in planar view and being disposed in a region where the first line and the second line overlap in the first contact hole, the sides specifying the width of the one of the first line and the second line,
the first insulating laser includes two second contact holes in the connecting section,
the first line and the second line are electrically connected to each other via a connecting conductor disposed in the first contact hole and the two second contact holes,
the connecting conductor and the first line are electrically connected to each other in each of the two second contact holes, and
the connecting conductor and the second line are electrically connected to each other in the first contact hole.

2. The active matrix substrate as set forth in claim 1, wherein:
one of the first line and the second line is a branch line connected to one of the drive elements;
the other one of the first line and the second line is a connecting line connected to the branch line; and
the connecting line is connected to another one of the drive elements which is in a stage different from a stage which includes the one of the drive elements to which the branch line is connected.

3. The active matrix substrate as set forth in claim 1, wherein:
one of the first line and the second line is a branch line connected to one of the drive elements;
the other one of the first line and the second line is a connecting line connected to the branch line; and the connecting line is connected to another one of the drive elements which is in a stage identical to a stage which includes the one of the drive elements to which the branch line is connected.

4. The active matrix substrate as set forth in claim 2, wherein for the connecting line and the branch line which are connected to each other in the connecting section, there is provided a wire made of a material identical to a material of which the branch line is made, the wire being disposed either in an area located on a top side or a bottom side of the branch line or in areas on the top and bottom sides in planar view, with a direction in which the branch line extends being taken as a lateral direction.

5. The active matrix substrate as set forth in claim 1, wherein either one of the first line and the second line is provided so as to have the width thereof expanded in the first contact hole in planar view.

6. The active matrix substrate as set forth in claim 1, wherein a line connected in the connecting section has a width, specified by sides of the line, which is not expanded in the first contact hole, at least one of the sides being disposed in the first contact hole in planar view.

7. An active matrix substrate, comprising, on an insulating substrate, switching elements and pixel electrodes in a matrix manner, the pixel electrodes being connected to the switching elements, the pixel electrodes being provided in a matrix manner in a display area of the insulating substrate, a frame area being provided so as to surround the display area, the frame area including a drive circuit configured to drive the switching elements, the drive circuit including a plurality of circuit sections including respective drive elements, the frame area including, on the insulating substrate, a first line and a second line, provided sequentially, configured to supply signals to the drive elements, the first line including a portion that extends in a direction different from a direction in which the second line extends and the second line being electrically connected to the first line, which is configured to supply a clock signal, such that the clock signal is supplied to a corresponding one of the plurality of circuit sections, a first insulating layer being provided between the first line and the second line, a second insulating layer being provided so as to cover the first insulating layer and at least one of the first line and the second line, in the connecting section in which the first line and the second line are connected to each other, the second insulating layer including two first contact holes, each of the two first contact holes being provided in a direction in which either one of the first line and the second line extends, a portion of the other one of the first line and the second line being disposed in each of the two first contact holes in planar view, the first line and the second line overlapping in the first contact hole in planar view, and one of the sides of the other one of the first line and the second line being disposed in one of the two first contact holes in planar view and another one of the sides being disposed in another one of the two first contact holes in planar view and disposed in a region where the first line and the second line overlap in each of the two first contact holes, the sides specifying the width of the one of the first line and the second line, and the first line and the second line are electrically connected to each other via a connecting conductor in each of the two first contact holes.

8. The active matrix substrate as set forth in claim 7, wherein the first insulating layer includes a second contact hole in the connecting section.

9. The active matrix substrate as set forth in claim 8, wherein the first line and the second line are electrically connected to each other via a connecting conductor disposed in the first and second contact holes.

10. The active matrix substrate as set forth in claim 1, wherein:
one of the first line and the second line is a branch line connected to one of the drive elements;
the other one of the first line and the second line is a stem line for externally supplying a signal to the branch line; and
a plurality of the branch lines are connected commonly to the stem line.

11. The active matrix substrate as set forth in claim 1, wherein the connecting conductor is made of a material identical to a material of which the pixel electrodes are made.

12. The active matrix substrate as set forth in claim 1, wherein the switching elements and the drive elements are transistor elements.

13. A display device, comprising:
an active matrix substrate as set forth in claim 1; and
a counter substrate, the active matrix substrate and the counter substrate being disposed so as to face each other.

14. The active matrix substrate as set forth in claim 7, wherein:
one of the first line and the second line is a branch line connected to one of the drive elements;
the other one of the first line and the second line is a stem line for externally supplying a signal to the branch line; and
a plurality of the branch lines are connected commonly to the stem line.

15. The active matrix substrate as set forth in claim 9, wherein the connecting conductor is made of a material identical to a material of which the pixel electrodes are made.

16. The active matrix substrate as set forth in claim 7, wherein the switching elements and the drive elements are transistor elements.

17. A display device, comprising:
an active matrix substrate as set forth in claim 7; and
a counter substrate, the active matrix substrate and the counter substrate being disposed so as to face each other.

18. The active matrix substrate as set forth in claim 1, wherein an end of the second line has a tapered shape.

* * * * *